US007574689B2

(12) United States Patent
Igelbrink et al.

(10) Patent No.: US 7,574,689 B2
(45) Date of Patent: Aug. 11, 2009

(54) GENERIC INTERFACE TO PROVIDE OBJECT ACCESS DISPLAY VIEWS BASED ON OBJECT TYPE

(75) Inventors: Michael Igelbrink, Sandhausen (DE); Christoph Albrecht, Walldorf (DE)

(73) Assignee: SAP AG, Walldorf (DE)

( * ) Notice: Subject to any disclaimer, the term of this patent is extended or adjusted under 35 U.S.C. 154(b) by 911 days.

(21) Appl. No.: 11/169,207

(22) Filed: Jun. 28, 2005

(65) Prior Publication Data

US 2006/0293944 A1 Dec. 28, 2006

(51) Int. Cl.
G06F 9/44 (2006.01)
G06F 9/45 (2006.01)

(52) U.S. Cl. .................. 717/100; 717/108; 717/120

(58) Field of Classification Search .......... 717/100–102, 717/108, 116, 120
See application file for complete search history.

(56) References Cited

U.S. PATENT DOCUMENTS

| | | | | |
|---|---|---|---|---|
| 5,790,861 A * | 8/1998 | Rose et al. | ............. | 717/145 |
| 6,324,619 B1 * | 11/2001 | Raverdy et al. | ............. | 717/120 |
| 6,550,057 B1 * | 4/2003 | Bowman-Amuah | ......... | 717/126 |
| 6,601,233 B1 * | 7/2003 | Underwood | ............. | 717/102 |
| 6,957,439 B1 * | 10/2005 | Lewallen | ............. | 719/328 |
| 6,990,636 B2 * | 1/2006 | Beauchamp et al. | ........ | 715/764 |
| 6,993,743 B2 * | 1/2006 | Crupi et al. | ............. | 717/102 |
| 7,100,148 B2 * | 8/2006 | Schneider et al. | ............. | 717/107 |
| 7,107,575 B1 * | 9/2006 | Mor et al. | ............. | 717/120 |
| 7,185,343 B1 * | 2/2007 | Quast | ............. | 719/315 |
| 7,272,815 B1 * | 9/2007 | Eldridge et al. | ............. | 717/101 |
| 7,340,714 B2 * | 3/2008 | Upton | ............. | 717/102 |
| 7,346,893 B2 * | 3/2008 | Deimel et al. | ............. | 717/121 |
| 7,386,864 B2 * | 6/2008 | Richardson | ............. | 719/321 |
| 7,451,434 B1 * | 11/2008 | Blumenthal et al. | ......... | 717/116 |
| 7,458,061 B2 * | 11/2008 | Bracha | ............. | 717/116 |
| 7,506,334 B2 * | 3/2009 | Curtis et al. | ............. | 717/170 |

OTHER PUBLICATIONS

Kuno et al, "Developing an object oriented view management system", ACM, pp. 548-562, 1993.*
Vaziri et al, "Associating synchronization constraints with data in an object oriented language", ACM POPL, pp. 334-345, 2006.*
Evered, "Flexible enterprise access control with object oriented view specification", ACM AISW, pp. 1-8, 2003.*
Mattsson, "Maturity status within front end support organization", IEEE ICSE, pp. 1-10, 2007.*

* cited by examiner

*Primary Examiner*—Anil Khatri
(74) *Attorney, Agent, or Firm*—Buckley, Maschoff & Talwalkar LLC (57) ABSTRACT

Some embodiments are associated with a business information enterprise system having a front-end and a back-end. Moreover, it may be determined that a first object access display (e.g., an open or save dialog box) is to be provided at the front-end for a first type of object. A generic interface between the front-end and the back-end may then be used to provide the first object access display with a first object view based on the first object type. It may also be determined that a second object access display is to be provided at the front-end for a second type of object. In this case, the generic interface may be used to provide the second object access display with a second object view based on the second object type.

29 Claims, 10 Drawing Sheets

| OBJECT TYPE IDENTIFIER | HISTORY | FAVORITES | ROLES |
|---|---|---|---|
| OBJ_T_001 | Y | Y | Y |
| OBJ_T_002 | Y | N | N |
| OBJ_T_003 | N | N | N |
| OBJ_T_004 | N | Y | N |
| OBJ_T_005 | Y | Y | N |

BEHAVIOR TABLE

GENERIC INTERFACE TO PROVIDE OBJECT ACCESS DISPLAY VIEWS BASED ON OBJECT TYPE

FIELD

Some embodiments of the present invention relate to business information enterprise systems. In particular, some embodiments are associated with a generic interface to provide object access display views based on an object type.

BACKGROUND

A business information enterprise system can improve an organization's ability to monitor and manage data in a complex business environment. For example, the system might store a large amount of information, such as yearly global sales figures on both a company-wide and regional basis. Different users may then access the information in different ways. For example, a first user might be interested in a normalized comparison of each year's sales figures as compared to other years. Another user might instead want to compare historical sales figures on a region-by-region basis. Note that many different types of data could be stored by, and accessed from, a business information enterprise system (e.g., inventory data, employee data, and/or accounting data), and that different types of data will be used by different organizations.

In some cases, a user or system designer might want to modify the way that information is displayed. For example, a system designer might want to add a "favorites" icon to an open or save dialog box. When selected by a user, the favorites icon might, for example, arrange for a list of the user's favorite items to be displayed (e.g., his or favorite reports or queries). Similarly, a system may be modified to support an entirely new type of information (and a user or system designer might want to determine how the new type of information will be displayed).

Approaches that may improve the ability to flexibly and efficiently update a business information enterprise system may therefore be desirable. Moreover, it may advantageous to provide support for new types of information in a relatively timely and cost efficient manner.

DETAILED DESCRIPTION

Figure 1:
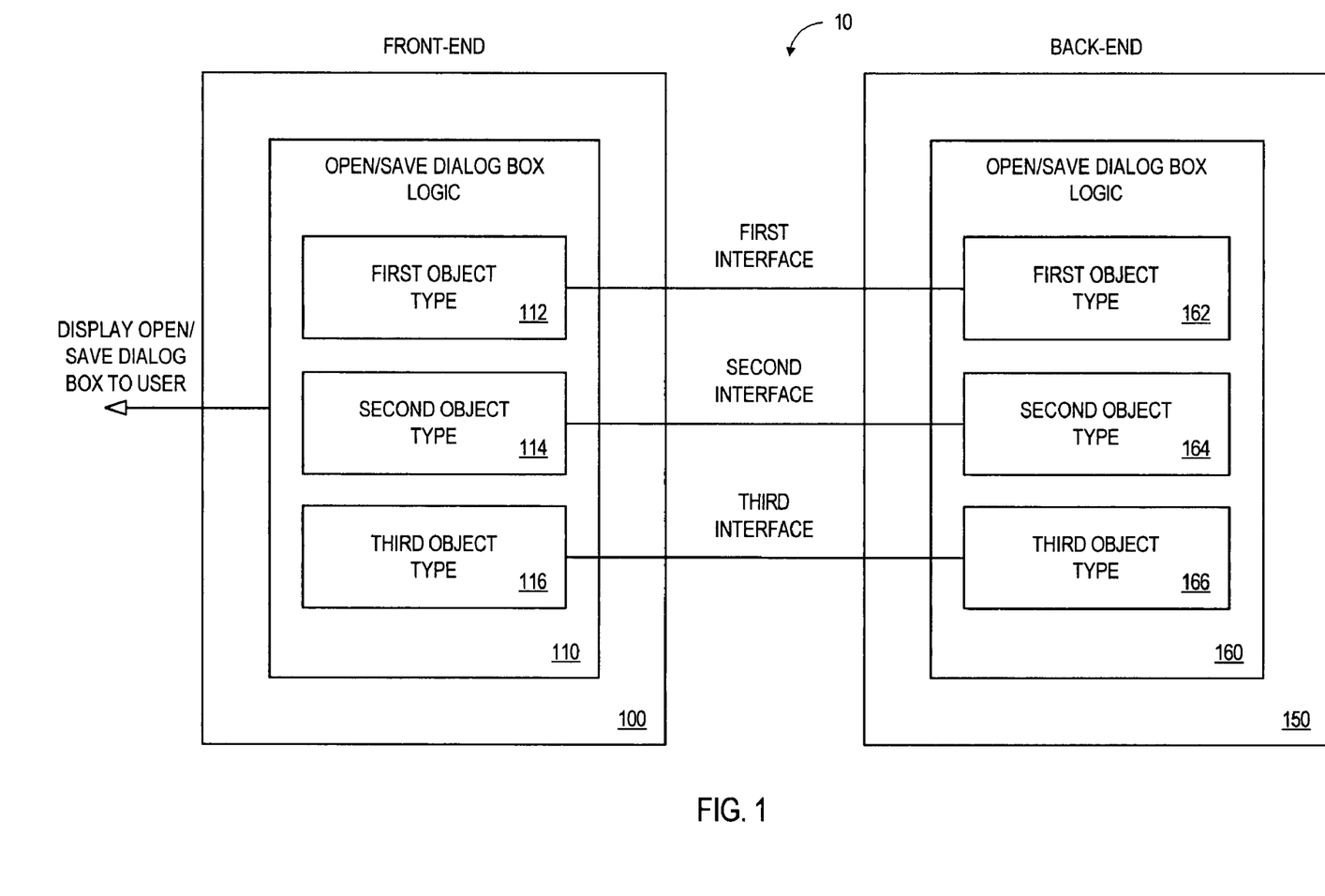
FIG. 1 is a block diagram illustrating the display of open and save dialog boxes associated with a business information enterprise system.

To alleviate problems inherent in the prior art, some embodiments of the present invention introduce systems, methods, computer program code and means to facilitate the display of open and save dialog boxes associated with a business information enterprise system. For example, FIG. 1 is a block diagram illustrating a business information enterprise system 10 that includes a back-end 150. The back-end 150 might be designed, for example, to store and process a substantial amount of business information associated with an enterprise.

The system 10 also includes a front-end 100 that may be accessed by a user. Note that the front-end 100 may be remote from the back-end 150 (e.g., and the two components 100, 150 may communicate via a communication network such as the Internet).

A user may access the front-end 100 to request particular information, in a particular format, from the back-end 150. For example, the user might access information via the front-end 100 through different types of "objects." As used herein, the term "object" might refer to, for example, a spreadsheet workbook such as a MICROSOFT® EXCEL® workbook. Other types of objects that might be accessed include Web applications and queries. For example, the user might generate a request or "query" asking for weekly inventory information from a number of different regions. After the data is retrieved by the back-end 150, it may be formatted as a report and displayed to the user via the front-end 100.

A user may access various objects using a Graphical User Interface (GUI), such as by selecting icons to activate functions that let him or her navigate and/or analyze an object. For example, a user may select icons to "open" an object or to "save" an object. In either case, an object access display may be provided to the user, such as an open or save dialog box programmed in the programming language VISUAL BASIC (VB).

A number of different formatting options or "views" may be available when presenting the object access display to a user. For example, an open or save dialog box might include icons associated with "favorites" information (e.g., information that is frequently accessed might be displayed as a tree structure when such an icon is selected by a user) or "history" information (e.g., information that has been recently accessed). Moreover, different types of objects might be associated with different views.

To accommodate different types of views, the front-end 100 may include open/save dialog box display logic 110. For example, three different types of objects may be associated with programming logic 112, 114, 116 to support views for those types of objects. Similarly, the back-end 150 may include open/save dialog box display logic 160, and each of the three types of objects may be associated with programming logic 162, 164, 166 to support views for those types of objects. Moreover, each type of object may have it's own interface between the logic 110 in the front-end 100 and the logic 160 in the back-end 150.

Such an approach, however, can be difficult to maintain and update. For example, when a new type of object is added to the system 10, the logic 110 in the front-end 100 and the logic 160 in the back-end 150 may need to be updated. Moreover, a new interface may need to be created. These tasks can be time-consuming and error prone.

Figure 2:
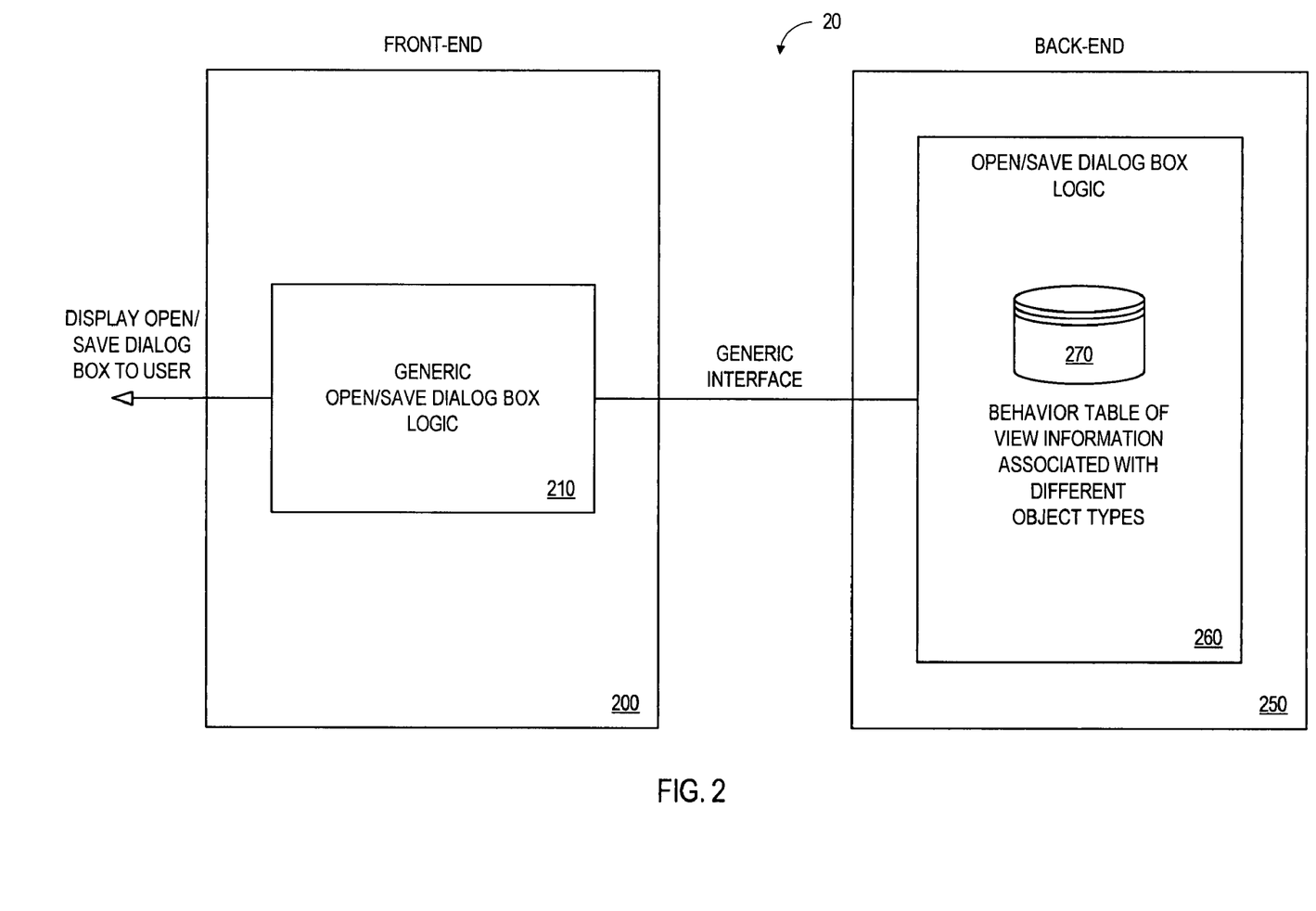
FIG. 2 is a block diagram illustrating the display of open and save dialog boxes associated with a business information enterprise system according to some embodiments.

To reduce these problems, FIG. 2 is a block diagram illustrating the display of open and save dialog boxes for a business information enterprise system 20 according to some embodiments. As before, an object access display (e.g., an open or save dialog box) can be provided to a user via a front-end 200. According to this embodiment, however, the front-end 210 uses generic open/save dialog box logic 210 (e.g., to provide a VB dialog box). In particular, the logic 210 in the front-end 200 exchanges data with open/save dialog box logic 260 in a remote back-end 250 via a generic interface. The logic 260 in the back-end 250 may include, for example, a behavior table 270 that contains view information associated with different types of objects. In this way, a new type of object may be added to the system 20 simply by adding one or more entries to the table 270 and/or other tables.

Figure 3:
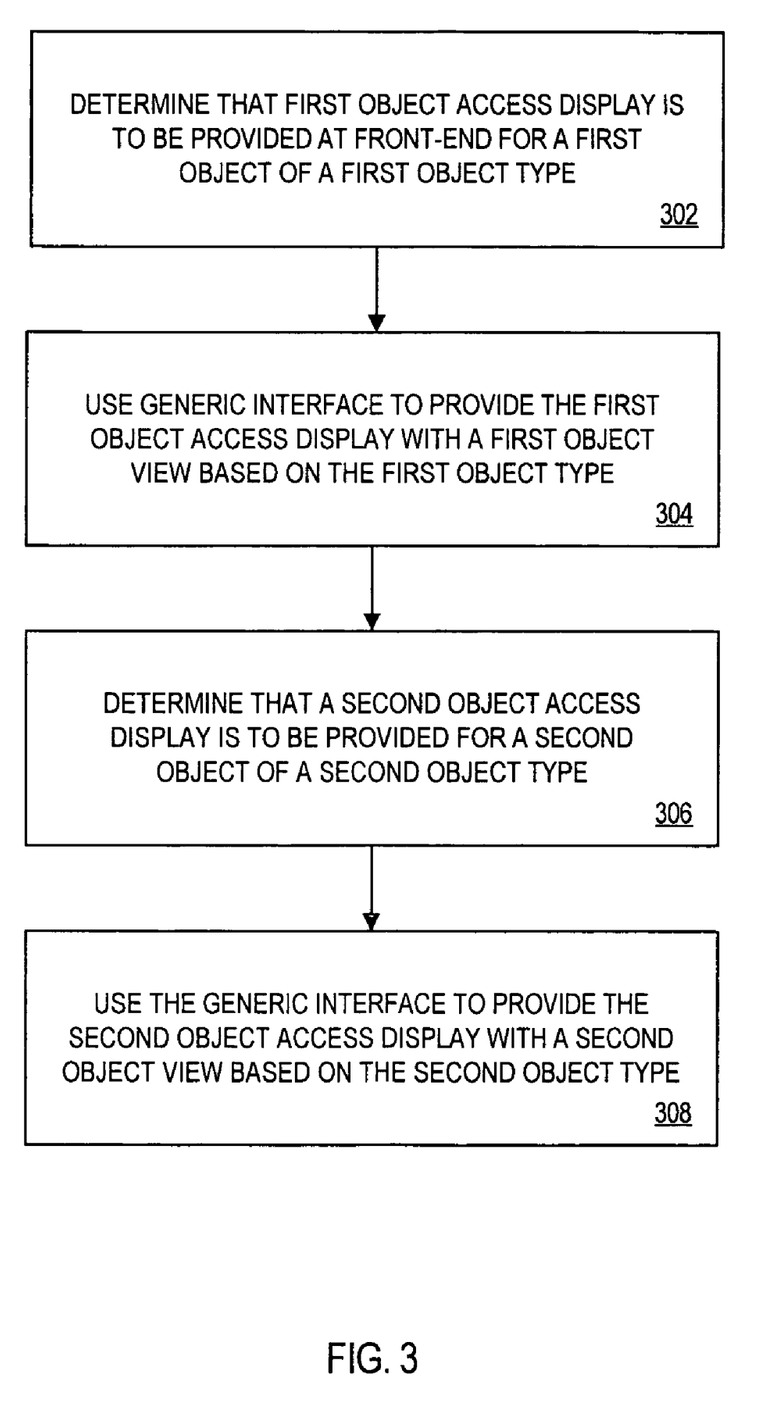
FIG. 3 is a flow diagram of process steps pursuant to some embodiments.

FIG. 3 is a flow diagram of process steps pursuant to some embodiments. The flow charts described herein do not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

At 302, it is determined that a first object access display is to be provided at a front-end system for a first object of a first object type. For example, a user may select a GUI toolbar icon or menu option to "open" or "save" a Web template. Other examples of object types include a Web application, a query, a query view, an exception, an alert, an item library, and a report.

Figure 4:
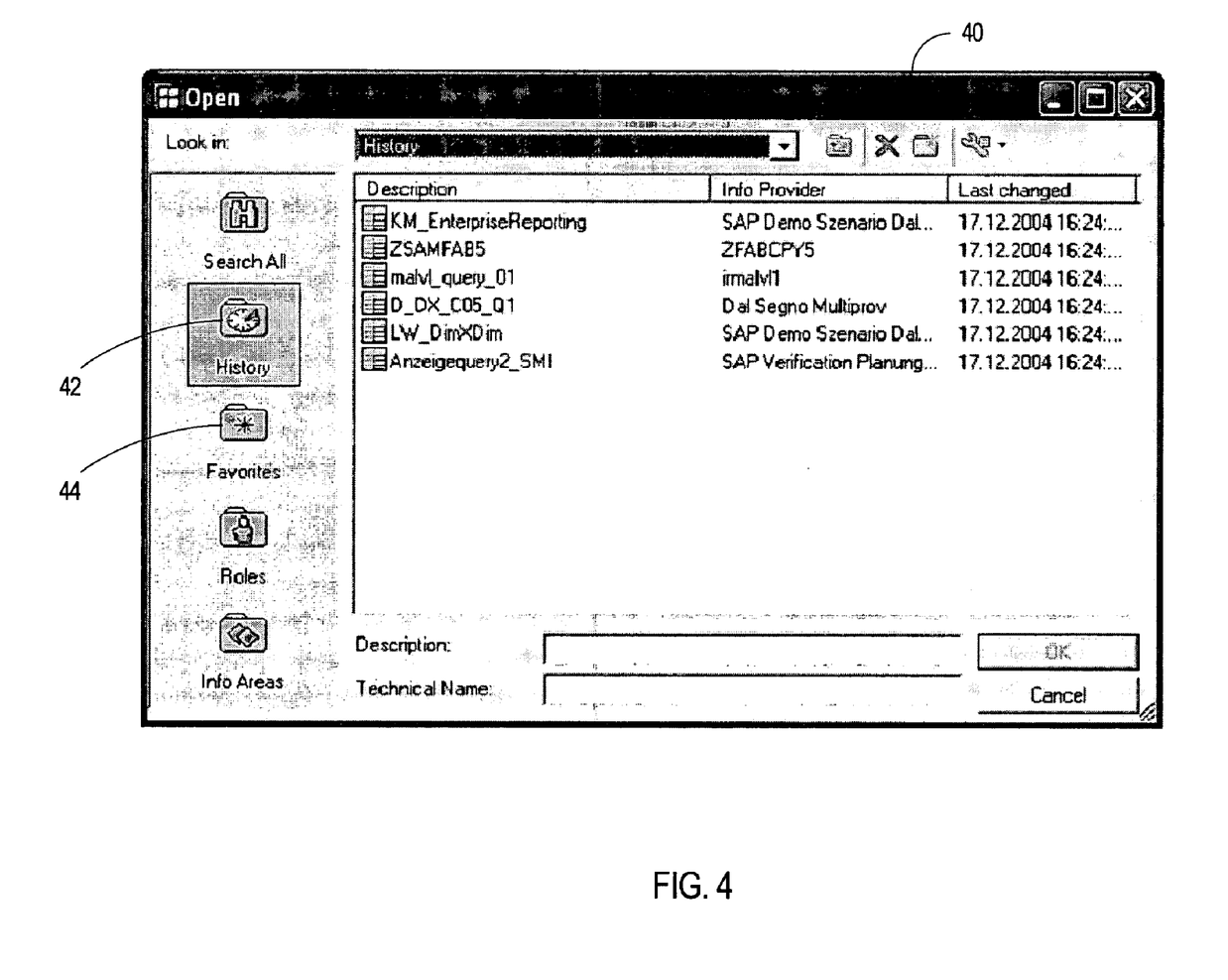
FIG. 4 illustrates an example of an open dialog box according to some embodiments.

At 304, a generic interface between the front-end system and a back-end system is used to provide the first object access display with a first object view based on the first object type. For example, FIG. 4 illustrates an example of an open dialog box 40 according to some embodiments. The box 40 for the particular type of object being opened has a view that includes a history icon 42 and a favorites icon 44. As other examples, a view might be associated with user role information, special information, folder-based information, portal-based information, programming language JAVA-based information, search information (e.g., supporting a search function), properties information (e.g., listing the creator and date of creation), or collaboration information.

Referring again to FIG. 3, it is determined at 306 that a second object access display is to be provided at the front-end system for a second object of a second object type (e.g., different than the first object type). For example, a user may select a GUI toolbar icon or menu option to "open" or "save" the spreadsheet workbook.

At 308, the generic interface between the front-end system and the back-end system is used to provide the second object second display with a second object view based on the first object type. For example, a display similar to the one shown in FIG. 4 might be provided without the history icon 42. Note that in some cases, different object types (e.g., a workbook object type and a query object type) might be opened through the same view (e.g., a history view). That is, the object types might be different while the object views are the same (e.g., both views might be "history" views, although different entries would be provided for the workbook object type as compared to the query object type).

Figure 5:
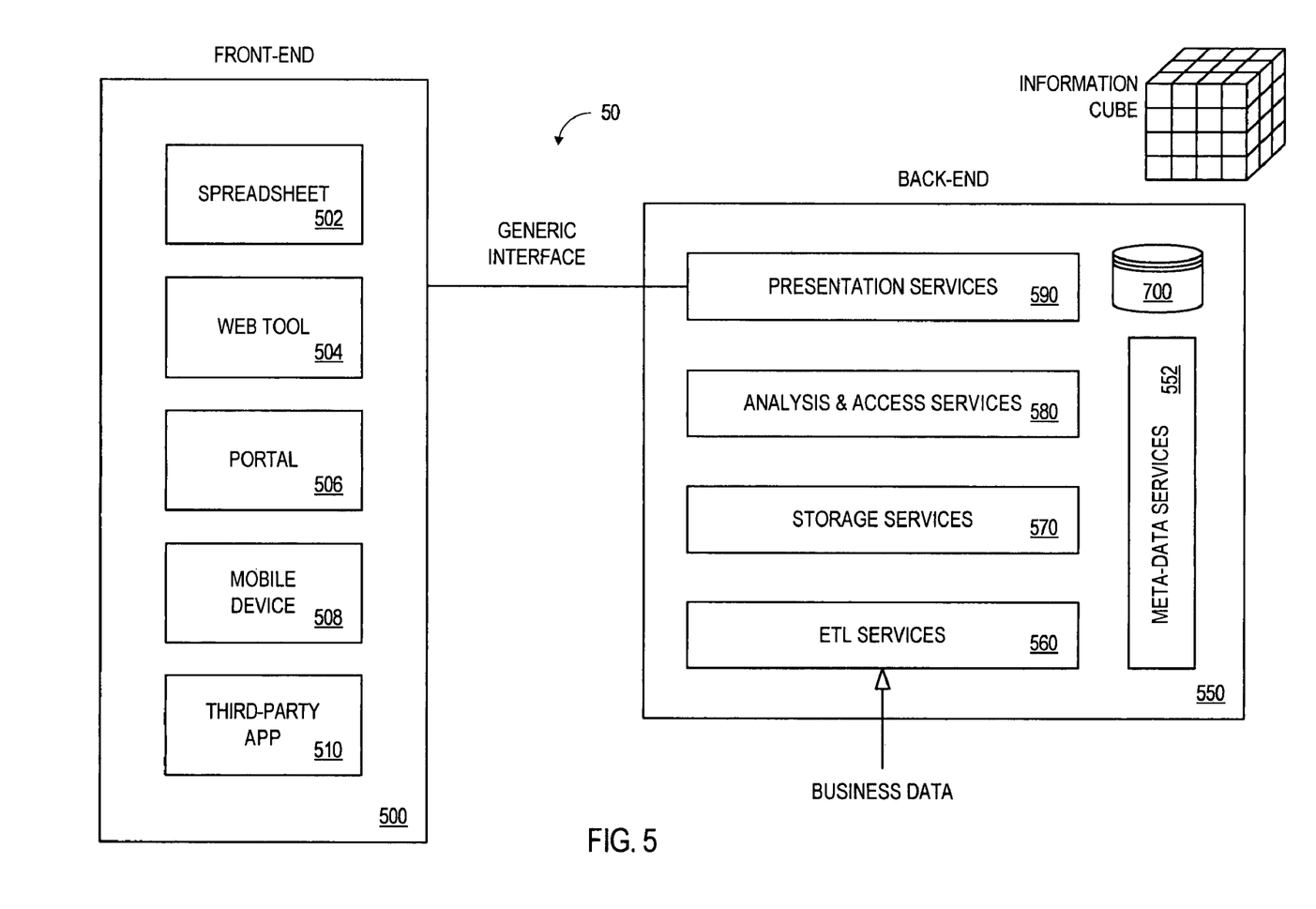
FIG. 5 is a block diagram of a business information enterprise system according to one embodiment.

FIG. 5 is a block diagram of a business information enterprise system 50 including a front-end 500 and a back-end 550 according to some embodiments. The front end 500 may be used to access business data (e.g., objects) from the system 50. The front-end 500 might be associated with, for example, a spreadsheet application 502, a Web tool 504 (e.g., a Web authoring tool or browser), a portal 506, a mobile device 508, or a third-party application 510.

The system 50 also includes a back-end 550 which may store and process business information. The back-end 550 might include, for example, one or more Extraction, Transformation, and Loading (ETL) services 560 to import actual business data into the system 50 (e.g., business data associated with an organization that actually using the system 50 as opposed to merely evaluating the system 50). The ETL services 560 might perform, for example, data extraction, data transformation, and data loading (e.g., via a staging engine).

The back-end 550 might also include one or more storage services 570 that store and archive business information. For example, the storage services 570 might provide access to different data targets available in the system 50, archive dormant data, and/or manage relational or multi-dimensional databases.

One or more analysis and access services 580 might also be provided in the back-end 550. Such a service 580 might, for example, facilitate an analysis of structured and/or unstructured information stored in the system 50 and may include a data mining engine.

In addition, the back-end 550 may include one or more presentation services 590 to provide different ways of presenting information to an end user. According to some embodiments, the presentation service 590 might include a query design engine, a formatting engine, and/or an Extensible Mark-up Language (XML) interface (e.g., to provide data via a Web portal). The presentation service 590 may further include generic open/save dialog box logic that access information in a behavior table 700 and exchanges data with the front-end 500 to provide a user with an appropriate view based on the type of object being accessed.

According to some embodiments, one or more "meta-data" services 552 are also provided at the back-end 550. As used herein, the term "meta-data" may refer to, for example, information about business data that is distributed across a landscape of a system's architectural components (e.g., describing what data resides where). The meta-data service 542 might, for example, store meta-data and handle requests to retrieve, add, change, or delete the meta-data.

One type of meta-data that might be associated with the system 50 is an "information object." As used herein, the phrase "information object" might refer to, for example, a low-level business object that describe business processes and/or information requirements. An example of an information object is a "key figure" that describes any kind of numeric information from the business process level, such as sales quantities or revenues. Another example of an information object is a "characteristic," which may describe the objects dealt with in a business process. Taken together, characteristics and key figures may comprise an "information cube." As used herein, the phrase "information cube" may refer to a multi-dimensional data container that acts as a basis for analysis and reporting processes for the business information enterprise system 50.

Figure 6:
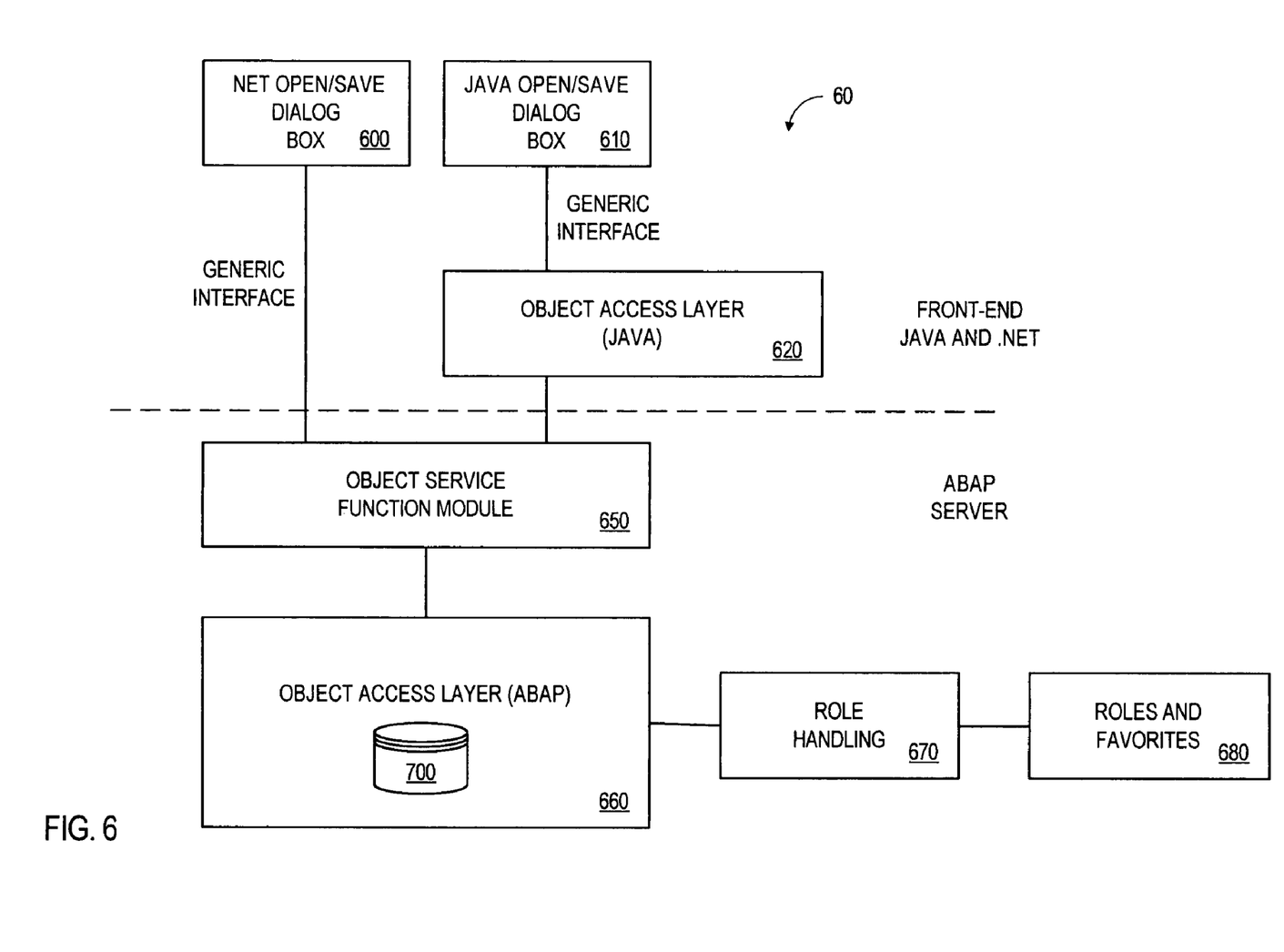
FIG. 6 illustrates functional components of a business information enterprise system according to one embodiment.

FIG. 6 illustrates functional components of a business information enterprise system 60 according to one embodiment. The system 60 includes a front-end having a MICROSOFT®.NET_open/save dialog box 600 and/or a JAVA open/save dialog box 610. The system 60 also includes an Advanced Business Application Programming (ABAP) server (separated from the front-end by a dashed line in FIG. 6). The ABAP server includes an object access layer 660 that communicates with the .NET open/save dialog box 600 through an object service function module 650 and a generic interface. The object access layer 660 also communicates with the JAVA open/save dialog box 610 through the object service function module 650 and an object access layer 620 at the front-end.

Figure 7:
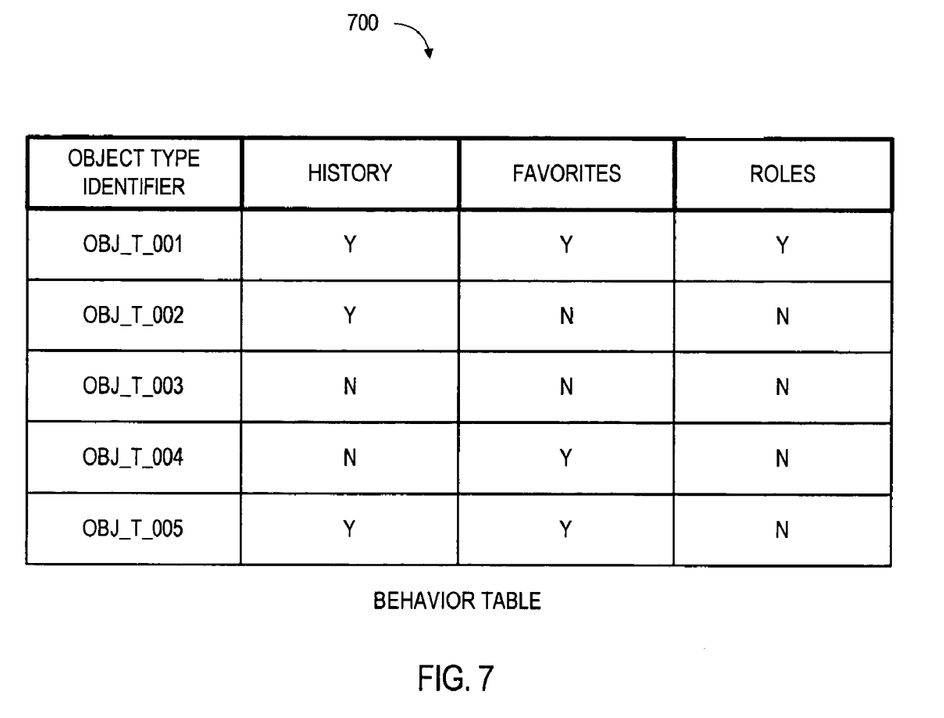
FIG. 7 illustrates an example of a behavior table according to some embodiments.

The object access layer 660 may determine, for example, roles and favorites information 680 via role handling logic 670. Moreover, the object access layer 660 may include (or otherwise have access to) a behavior table 700 that stores display properties that will determine what type of view should be provided for each type of object supported by the system 60. According to some embodiments, the type of view may be provided on a user-by-user basis or a system-wide basis.

Note that the business information enterprise system 60 could include elements in addition to, or instead of, the ones illustrated in FIG. 6. For example, the system 60 could include generic history and programming interfaces. In addition, Web services of, for example, ABAP based dialogs on the server might use the object service function module 650.

Referring to FIG. 7, a table represents the behavior table 700 that may be stored at an ABAP server according to an embodiment of the present invention. The illustration and accompanying description of the table 700 presented herein are exemplary, and any number of other arrangements could be employed besides those suggested by the figure. The table 700 includes entries associated with different types of objects that may be accessed. The table also defines fields for each entry to specify whether or not a view associated with each type of object should include a history, favorites, or roles. The information in the table 700 may be created and updated, for example, by a system programmer or administrator.

The object type identifier may be, for example, an alphanumeric code associated with a particular type of object (e.g., a Web template or workbook). For each object type identifier, the table 700 may define a number of view properties for an object access display (e.g., an open or save dialog box). For example, the table 700 might indicate that a "history" icon should be displayed (e.g., "Y") or should not be displayed (e.g., "N") for that type of object. According to some embodiments, a modified icon is displayed when a function is not available (e.g., the icon might become gray). The table 700 might also include, for example, behavior information about an object class, an object category, an object semantic, a Uniform Resource Locator (URL) type, a workbook code, a JAVA class, a search flag, a project attribute, a project value, an object view identifier, a display mode, a method name, a technical name flag, or a show properties flag.

Note that a new type of object might be defined (e.g., a report or a specific view of data) to use an open/save structure (e.g., history, favorites, roles, and search) without additional programming. For example, table entries might be filled and other generic services for the new object might be implemented. According to some embodiments, a behavior of the dialog might be customized and additional logic might be provided through exist (e.g., on an ABAP server).

Figure 8:
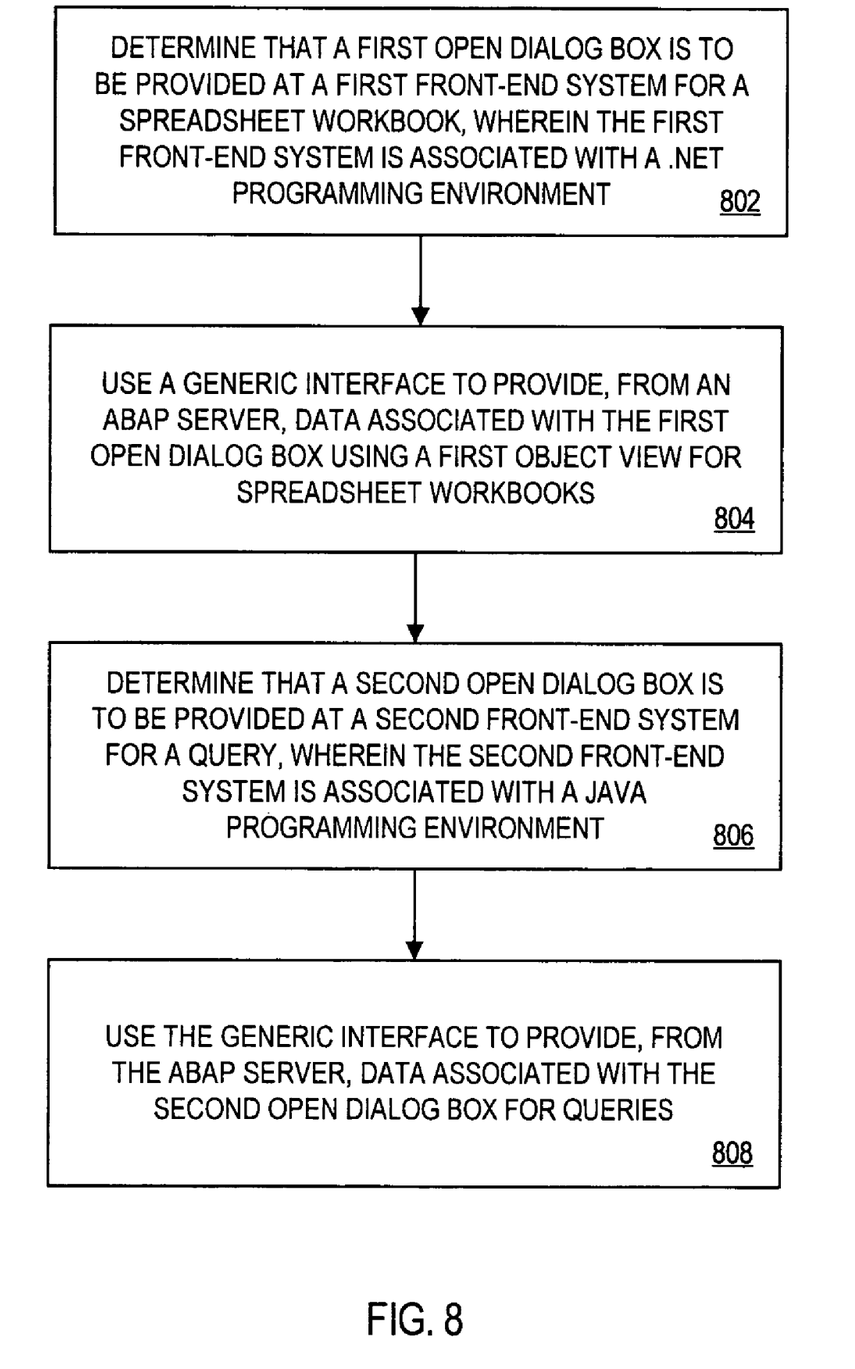
FIG. 8 is a flow diagram of process steps to provide an open dialog box pursuant to some embodiments.

FIG. 8 is a flow diagram of process steps to provide an open dialog box pursuant to some embodiments. At 802, it is determined that a first open dialog box is to be provided at a first front-end system for a first object of a first object type. In particular, the first object is a spreadsheet workbook. Moreover, the first front-end system is associated with a .NET programming environment. Note that the determination might be made based on a user's selection of a GUI icon.

At 804, a generic interface is used to provide, from an ABAP server, data associated with the first open dialog box such that the box is displayed with a first object view based on the first object type. That is, a particular view will be provided because the object is a workbook.

It is determined at 806 that a second open dialog box is to be provided at a second front-end system for a second object of a second object type (different than the first object type). In this example, the second object is a query. In addition, the second front-end system is associated with a JAVA programming environment.

At 808, the generic interface is used to provide, from the ABAP server, data associated with the second open dialog box such that the box is displayed with a second object view based on the second object type. That is, a particular view will be provided because the object is a query.

Similarly, one or more generic interfaces may be used to add new object views (e.g., programming interfaces may be added in JAVA and/or ABAP to support the addition of such views). Moreover, generic interfaces might be added to enhance functionality by adding information to specific object (e.g., the name of an information provider for a query might only be added for the object type query).

Figure 9:
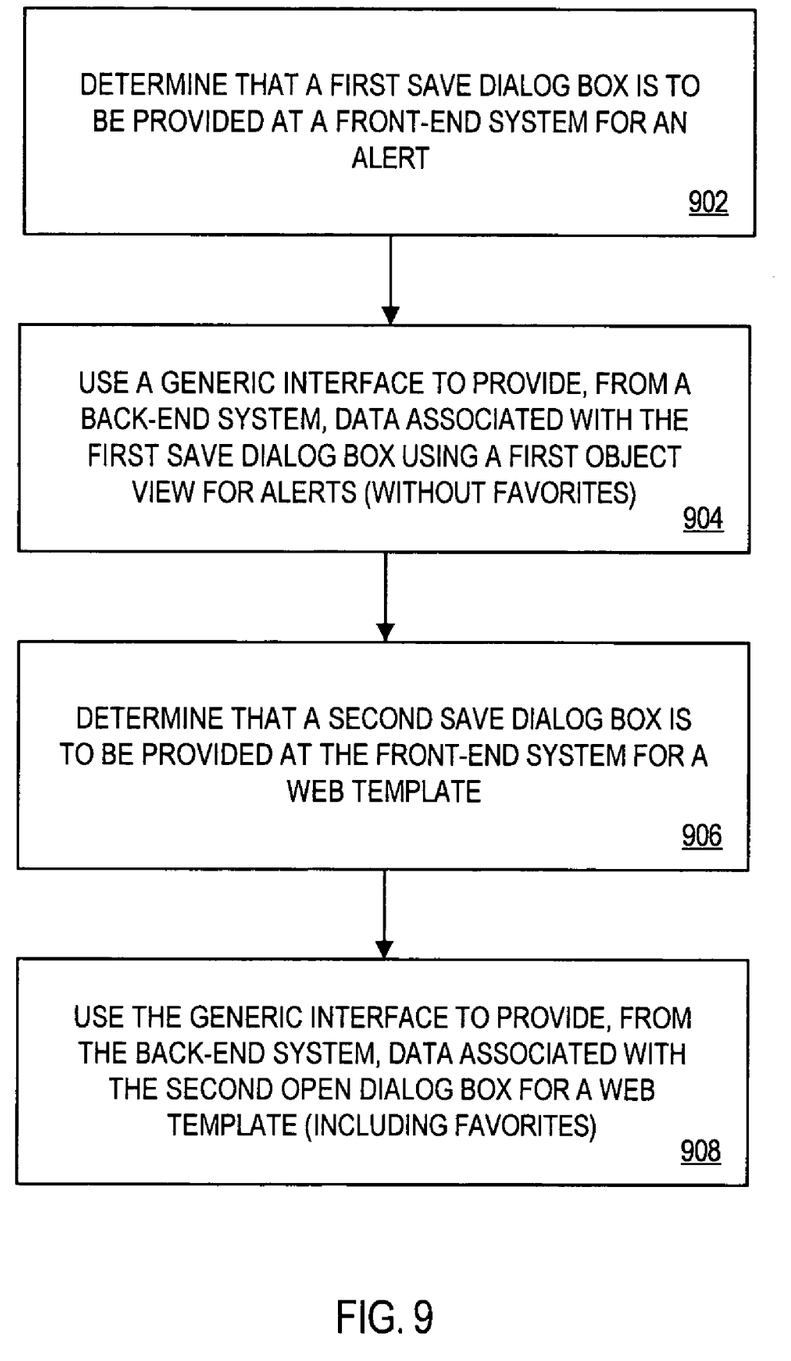
FIG. 9 is a flow diagram of process steps to provide a save dialog box pursuant to some embodiments.

FIG. 9 is a flow diagram of process steps to provide a save dialog box pursuant to some embodiments. At 902, it is determined that a first save dialog box is to be provided at a front-end system for a first object of a first object type. In particular, the first object is an alert.

At 904, a generic interface is used to provide, from a back-end system, data associated with the first save dialog box such that the box is displayed with a first object view based on the first object type. In particular, a specific view that does not include a "favorites" icon is provided because the object is an alert.

It is determined at 906 that a second open dialog box is to be provided at the front-end system for a second object of a second object type (different than the first object type). In this example, the second object is a Web template.

At 908, the generic interface is used to provide, from the back-end system, data associated with the second open dialog box such that the box is displayed with a second object view based on the second object type. In particular, a specific view that does include a "favorites" icon is provided because the object is a Web template.

Figure 10:
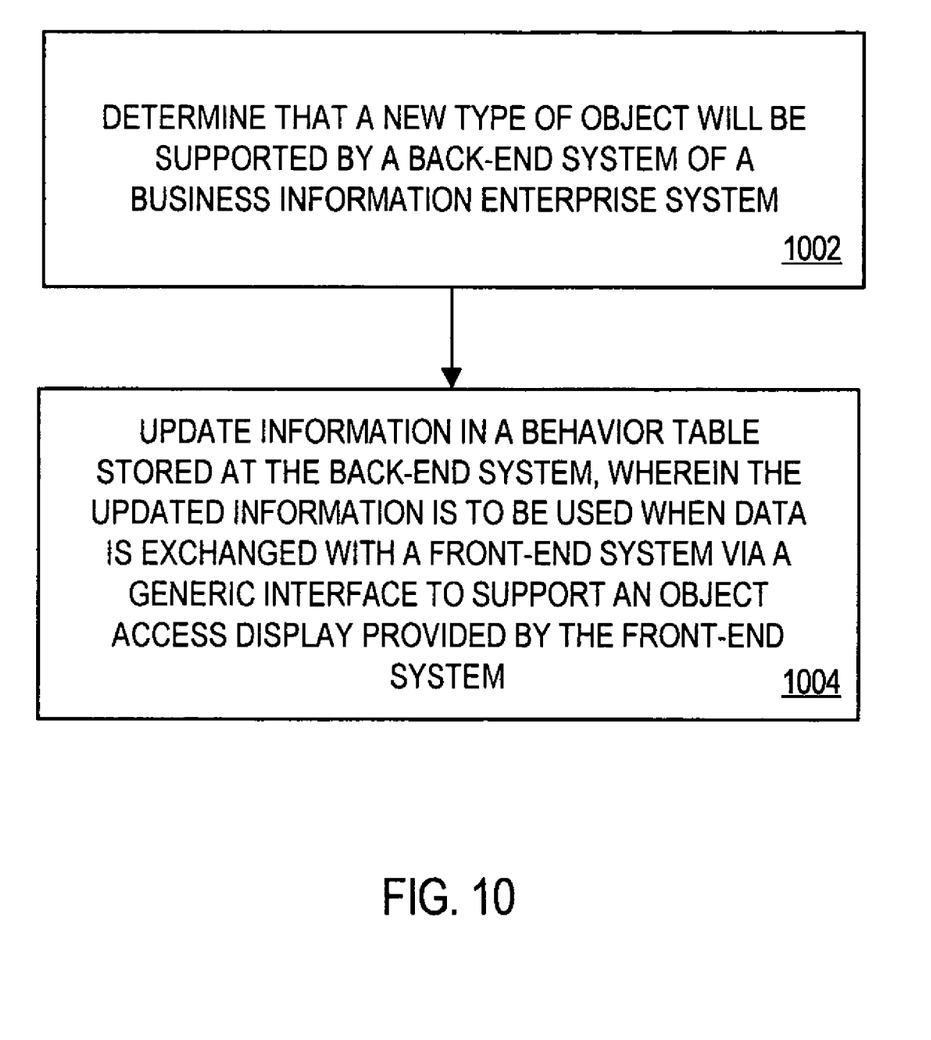
FIG. 10 is a flow diagram of process steps associated with adding support for a new object type to an ABAP server pursuant to some embodiments.

Information about which views are appropriate for which types of objects may be provided by a system designer. FIG. 10 is a flow diagram of process steps associated with adding support for a new object type to an ABAP server pursuant to some embodiments.

At 1002, it is determined that a new type of object is to be supported by a back-end system of a business information enterprise system. For example, a system designer might decide that the system should now support the use of "alert" objects.

At 1004, information is updated in a behavior table stored at the back-end system, wherein the updated information is to be used when data is exchanged with a front-end system via a generic interface to support an object access display provided by the front-end system. For example, the system designer might manually create a new entry in the table. According to other embodiments, some or all of this information may be automatically generated, such as when a "default" view is automatically provided. As another example, a presentation layer might save an object into and/or open an object from a hierarchical structure. In this case, a child object might inherit some or all of the view characteristics from a parent object.

According to some embodiments, a new object type or view that is created might represent a combination of several other object types or views. For example, a new object type might represent a union of two other object types (e.g., favorite entries for both queries and workbooks might be combined in a single object view). Note that other kinds of combinations might also be provided (e.g., only entries that are both (i) not in favorites and (ii) currently included in history might be displayed).

The embodiments described herein are solely for the purpose of illustration. Those skilled in the art will recognize other embodiments may be practiced with modifications and alterations limited only by the claims.

What is claimed is:

1. A method associated with a business information enterprise system having a front-end system and a back-end system, comprising:
   determining, at the front end system, that a first object access display is to be provided at the front-end system for a first object of a first object type;
   using a generic interface between the front-end system and the back-end system to provide the first object access display with a first object view based on the first object type;
   determining, at the front end system, that a second object access display is to be provided at the front-end system for a second object of a second object type, the second object type being different than the first object type; and
   using the generic interface to provide the second object access display with a second object view based on the second object type, the second object view being different than the first object view;
   wherein a presentation layer at the back-end system arranges to provide the first object access display using the first object view based on the first object type;
   wherein said arranges to provide the first object access display includes determining display properties for the first object access display in accordance with entries in a behavior table stored at the back-end system; and
   wherein the behavior table includes:
      a first field that specifies an object identifier associated with the first object type;
      a second field that specifies whether to include a first icon in the first object access display; and
      a third field that specifies whether to include a second icon in the first object access display.

2. The method of claim 1, wherein at least one object access display is associated with at least one of: (i) an open dialog box, or (ii) a save dialog box.

3. The method of claim 2, wherein at least one object access display is provided using a dialog box associated with the front-end application.

4. The method of claim 1, wherein at least one object type is associated with at least one of: (i) a Web template, (ii) a Web application, (iii) a query, (iv) a query view, (v) a spreadsheet, (vi) a workbook, (vii) an exception, (viii) an alert, (ix) an item library, or (x) a report.

5. The method of claim 1, wherein at least one object view is associated with at least one of: (i) a button, (ii) displayed information, or (iii) a function.

6. The method of claim 1, wherein at least one object view is associated with at least one of: (i) history information, (ii) favorites information, (iii) role information, (iv) special information, (v) folder-based information, (vi) portal-based information, (vii) JAVA-based information, (viii) search information, (ix) properties information, or (x) collaboration information.

7. The method of claim 1, wherein the front-end system is remote from the back-end system, and the systems communicate via a communication network.

8. The method of claim 1, wherein the presentation layer includes an advanced business application programming server.

9. The method of claim 1, wherein an entry in the behavior table is associated with at least one of: (i) an object type identifier, (ii) an object class, (iii) an object category, (iv) an object semantic, (v) a uniform resource locator type, (vi) a workbook code, (vii) a JAVA class, (viii) a search flag, (ix) a project attribute, (x) a project value, (xi) an object view identifier, (xii) a display mode, (xiii) a method name, (xiv) a technical name flag, or (xv) a show properties flag.

10. The method of claim 1, wherein the presentation layer saves at least one object into and opens at least one object from a hierarchical structure.

11. The method of claim 1, wherein a JAVA application at the front-end system communicates with the presentation layer of the back-end system.

12. The method of claim 1, wherein the first icon comprises a history icon.

13. The method of claim 12, wherein the second icon comprises a favorites icon or a roles icon.

14. The method of claim 1, wherein the first icon comprises a favorites icon.

15. The method of claim 14, wherein the second icon comprises a roles icon.

16. The method of claim 1, wherein the first icon comprises a roles icon.

17. The method of claim 1, wherein the behavior table further includes a fourth field that indicates whether to include a third icon in the first object access display.

18. The method of claim 17, wherein the first icon comprises a history icon, the second icon comprises a favorites icon and the third icon comprises a roles icon.

19. The method of claim 1, wherein the behavior table further includes:
   a fourth field that specifies an object identifier associated with the second object type;
   a fifth field that specifies whether to include the first icon in the second object access display; and
   a sixth field that specifies whether to include a second icon in the second object access display.

20. The method of claim 19, wherein the first icon comprises a history icon.

21. The method of claim 19, wherein the first icon comprises a favorites icon.

22. The method of claim 19, wherein the first icon comprises a roles icon.

23. A system, comprising:
   a front-end apparatus to determine (i) that a first object access display is to be provided for a first object of a first object type and (ii) that a second object access display is to be provided for a second object of a second object type; and
   a back-end apparatus to (1) exchange data with the front-end apparatus via a generic interface in order to facilitate creation of (i) the first object access display with a first object view based at least in part on the first object type and (ii) the second object access display with a second object view based at least in part on the second object type and (2) determine display properties for the first object access display in accordance with entries in a behavior table;
   wherein the behavior table includes:
      a first field that specifies an object identifier associated with the first object type;
      a second field that specifies whether to include a first icon in the first object access display; and a third field that specifies whether to include a second icon in the first object access display.

24. The system of claim 23, wherein the front-end apparatus is remote from the back-end apparatus, and the exchange of data is performed via the Internet.

25. The system of claim 23, wherein the back-end apparatus further comprises:
a storage unit to store a behavior table of display properties associated with the first and second object views.

26. A medium storing processor-executable process steps, the process steps comprising:
determining, at a front end system, that a first object access display is to be provided at the front-end system for a first object of a first object type;
using a generic interface between the front-end system and a back-end system to provide the first object access display with a first object view based on the first object type;
determining, at a front end system, that a second object access display is to be provided at the front-end system for a second object of a second object type;
using the generic interface to provide the second object access display with a second object view based on the second object type;
wherein using a generic interface between the front-end system and a back-end system to provide the first object access display includes using a generic interface between the front-end system and a back-end system to provide display properties for the first object access display determined in accordance with entries in a behavior table;
wherein the behavior table includes:
a first field that specifies an object identifier associated with the first object type;
a second field that specifies whether to include a first icon in the first object access display; and
a third field that specifies whether to include a second icon in the first object access display.

27. A method, comprising:
receiving, at a back-end application of a business information enterprise system, a request from a front-end application via an object-type-generic interface, the request being associated with an object access display to be presented to a user by the front-end application;
accessing object-type-specific presentation information stored at the back-end;
transmitting object-type-specific data to the front-end application in order to facilitate the presentation of the object access display to the user by the front-end application; and
determining, at the back-end, display properties for the object access display on a user-by-user basis and in accordance with entries in a behavior table stored at the back-end;
wherein the behavior table includes:
a first field that specifies an object identifier associated with the first object type;
a second field that specifies whether to include a first icon in the first object access display; and
a third field that specifies whether to include a second icon in the first object access display.

28. A method, comprising:
determining that a new type of object is to be supported by a back-end system of a business information enterprise system;
updating information in a behavior table stored at the back-end system, wherein the updated information is to be used when data is exchanged with a front-end system via a generic interface to support an object access display provided by the front-end system; and
determining, at the back-end system, display properties for the object access display in accordance with entries in a behavior table;
wherein the behavior table includes:
a first field that specifies an object identifier associated with the first object type;
a second field that specifies whether to include a first icon in the first object access display; and
a third field that specifies whether to include a second icon in the first object access display.

29. A method associated with a business information enterprise system having front-end systems remote from an advanced business application programming server, comprising:
determining, at a first front end system, that a first open or save dialog box is to be provided at the first front-end system for a first object of a first object type, wherein the first front-end system is associated with a first programming environment;
using a generic interface to provide, from the server, data associated with the dialog box such that the first dialog box will be displayed with a first object view based on the first object type;
determining, at a second front end system, that a second open or save dialog box is to be provided at the second front-end system for a second object of a second object type, wherein the second front-end system is associated with a second programming environment;
using the generic interface to provide, from the server, data associated with the second dialog box such that the second dialog box will be displayed with a second object view based on the second object type; and
determining, at the server, display properties for the first object access display in accordance with entries in a behavior table stored at the server;
wherein the behavior table includes:
a first field that specifies an object identifier associated with the first object type;
a second field that specifies whether to include a first icon in the first object access display; and
a third field that specifies whether to include a second icon in the first object access display.

* * * * *